(12) United States Patent
Trelewicz et al.

(10) Patent No.: US 7,310,168 B2
(45) Date of Patent: Dec. 18, 2007

(54) METHOD AND APPARATUS FOR CONTROLLING A SPOT FUNCTION FOR DIGITAL HALFTONING

(75) Inventors: Jennifer Quirin Trelewicz, Superior, CO (US); Danielle K. Dittrich, Longmont, CO (US); Yue Qiao, Longmont, CO (US); Gerhard Robert Thompson, Wappingers Falls, NY (US); Chai Wah Wu, Poughquag, NY (US)

(73) Assignee: InfoPrint Solutions Company LLC, Boulder, CO (US)

( * ) Notice: Subject to any disclaimer, the term of this patent is extended or adjusted under 35 U.S.C. 154(b) by 1068 days.

(21) Appl. No.: 09/898,254

(22) Filed: Jul. 3, 2001

(65) Prior Publication Data

US 2003/0063318 A1    Apr. 3, 2003

(51) Int. Cl.
*H04N 1/405*    (2006.01)
*G06K 15/00*    (2006.01)
(52) U.S. Cl. .................... 358/3.11; 358/3.09; 358/3.12
(58) Field of Classification Search ........ 358/3.11–3.13, 358/1.9, 3.06, 3.09
See application file for complete search history.

(56) References Cited

U.S. PATENT DOCUMENTS

| 4,196,451 | A |   | 4/1980  | Pellar ............................ 358/534 |
| 5,315,406 | A |   | 5/1994  | Levien |
| 5,469,516 | A |   | 11/1995 | Kerz |
| 5,526,445 | A |   | 6/1996  | Smutek et al. |
| 5,537,223 | A | * | 7/1996  | Curry .......................... 358/3.28 |
| 5,579,457 | A | * | 11/1996 | Hall ............................ 345/596 |
| 5,581,372 | A |   | 12/1996 | Kerz |
| 5,587,811 | A |   | 12/1996 | Liguori |
| 5,642,436 | A |   | 6/1997  | Kerz |
| 5,835,097 | A | * | 11/1998 | Vaswani et al. ............. 345/586 |
| 5,842,015 | A | * | 11/1998 | Cunniff et al. .............. 718/104 |
| 6,535,307 | B1| * | 3/2003  | Allen et al. ................. 358/504 |

FOREIGN PATENT DOCUMENTS

| JP | 1987-62-163149 | 7/1987 |
| JP | 1993-05-110858 | 4/1993 |
| JP | 1994-06-103092 | 4/1994 |
| JP | 1998-10-210292 | 8/1998 |
| JP | 2000-134484    | 5/2000 |
| WO | WO 96/04747    | 2/1996 |

* cited by examiner

*Primary Examiner*—David Moore
*Assistant Examiner*—James A. Thompson
(74) *Attorney, Agent, or Firm*—Duft Bornsen & Fishman, LLP

(57) ABSTRACT

A digital halftoning technique for controlling a spot function is disclosed. A method for generating a spot for use in halftoning according to the present invention includes defining a spot function that combines two functions selected to provide a predetermined spot shape for use in a halftone cell and scaling the spot function using a scaling function that varies according to a value of a first and second spot function ordinate. Asymmetric modulation of spot functions is used to control the touching of adjacent spots, and to change the shape of the spots with the gray region.

12 Claims, 4 Drawing Sheets

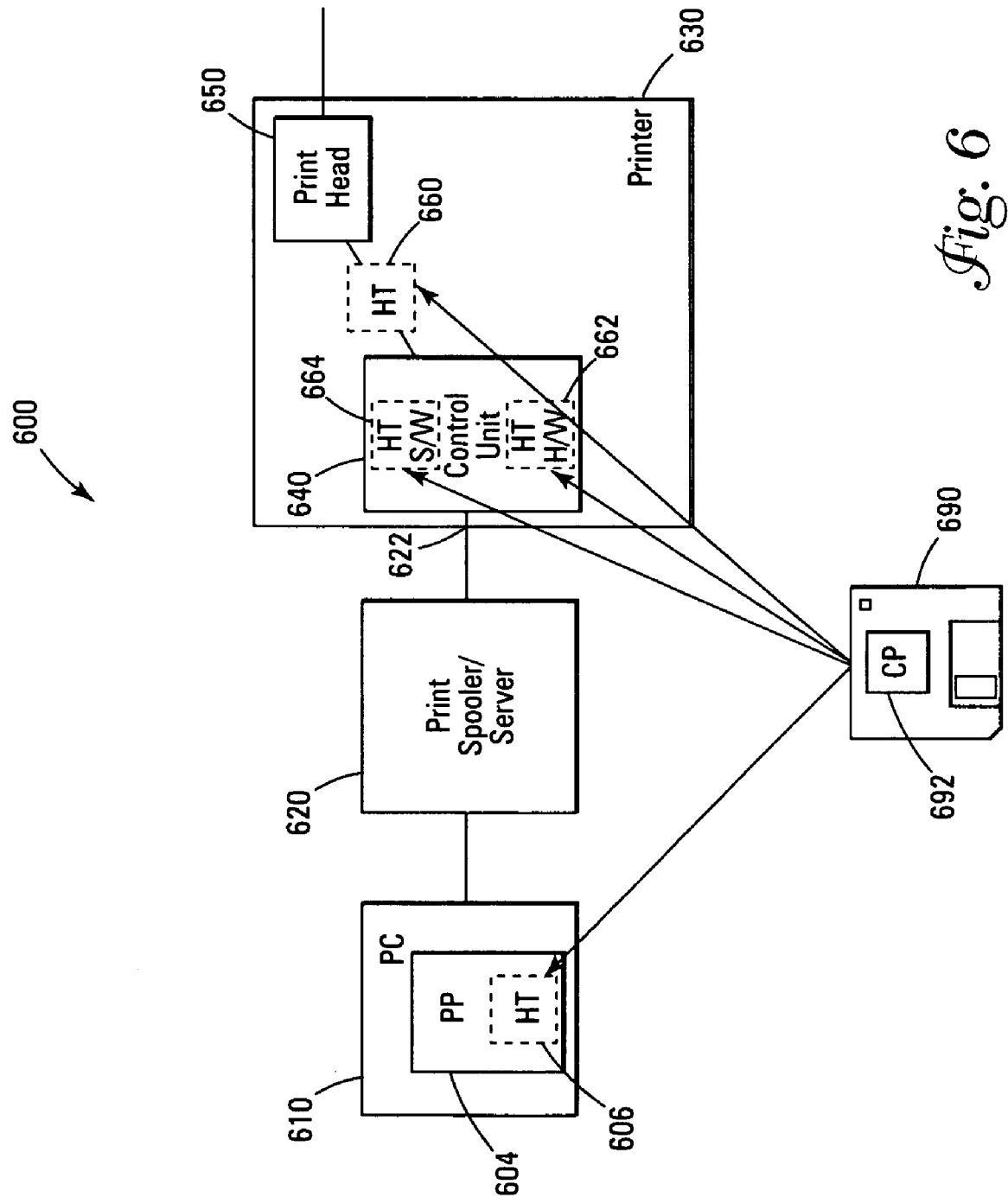

METHOD AND APPARATUS FOR CONTROLLING A SPOT FUNCTION FOR DIGITAL HALFTONING

BACKGROUND OF THE INVENTION

1. Field of the Invention

This invention relates in general to an image output device, and more particularly to digital halftoning techniques for controlling a spot function.

2. Description of Related Art

To print an image, a print engine processor, referred to herein as a raster image processor, converts the image in a page description language to a bit mapped image indicating a value to print at each pixel of the image. The bit mapped image is sent to the printer to cause the print heads to print the specified color value at the pixel according to the information in the bit map. If a printer has multiple print heads, such as a print head for different colors, then bit maps are generated for each print head. The print heads overlay the images defined by their respective bit maps onto the print medium.

To produce the bit maps for the print heads, numerous transformations must be performed on a print image, which may include different types of data, such as line art, e.g., text and graphics, and continuous tone (contone), e.g., images. This image processing may include operations such as data compression, color space conversion, and halftoning when generating the raster bit map to print. After dissecting a print image into different components, such as color components, text art, contone, images, etc., the different elements must be merged together so that the original image, previously split into different components, is reconstructed.

Digital halftoning, also referred to as spatial dithering, is the method of rendering the illusion of continuous-tone pictures on displays that are capable of producing only binary picture elements. Many printers cannot print 256 levels of gray. For example, an electrophotographic (EP) printer may only be able to print a black dot or no dot. Other printers can print 8 or 16 levels at one spot, but no more. However, it is desirable to print using 128-256 levels of gray to ensure that images look good. Halftoning takes a gray area and replaces it with a pattern of dots, much like what is done for newspaper pictures. The size of the dots in an area determines the macroscopic appearance of gray levels. Large black dots tend to make the area look darker, while small dots tend to make the area look lighter.

A pel is the smallest dot that can be displayed by an output device. In an EP printer, this is the size of a single dot drawn on the drum by the laser. Note that in the EP process, a single, isolated pel may not be drawn reliably because it is so small. This is a result of electrostatics. In an inkjet printer, a pel is the size of a drop of ink on the paper. A spot is a shape drawn in pels for halftoning. Rather than darkening a random pixel for every increase in gray level, it is preferable for the pixels to be darkened in a specific order pursuant to a "spot function". A spot may contain one or more pels. For example, in inkjet printing a single pel can be printed fairly reliably and therefore a spot for inkjet may be a single pel. In EP, because a single pel might not be printed reliably, a spot generally consists of several pels together. A cell is a tile region which can contain one or more spots. For example, a cell may contain one spot at the center and a quarter of each of 4 spots at the corner, although this depends on the design of the spot. The image is tiled with these cells to create the halftoned image. For spot functions utilizing threshold matrices, the pels or cell elements for which thresholds are exceeded are printed as black while the remaining elements are allowed to remain white. The human eye integrates the distribution of white and black over the cell as gray. In this manner, there can be gradual transitions from different shades of gray among adjacent halftone cells.

For color applications, several halftone cells, each corresponding to a different color component, are formed for a given area. The color system superimposes the halftone cells of different color components to form the desired color of the image. Halftoning facilitates varying the concentration or intensity level of color components within the color image by varying the number of darkened pixels for halftone cells corresponding to particular color components. In this manner, the image can have transitions between neighboring colors among adjacent halftone cells.

In the interest of speed, it is often desirable to store the pixels' representation of the spot function in memory for later use. To do so, the spot function is evaluated at the location of each pixel in the cell, the pixels are rank ordered according to their respective spot function values, and a threshold value representing 0% to 100% is assigned to each pixel according to its rank. Each pixel has an associated "threshold value" which is equal to the gray level at which that pixel is darkened. If a spot which represents a gray level of 75% is desired, the spot is created by darkening every pixel with a threshold value of 75% or less. A single collection of pixels with threshold values representing a spot function is defined herein as a "halftone cell" or "cell" as defined earlier above. The terms "spot function" and "cell" are often interchangeable, as a cell is a quantized representation of a spot function, and the threshold values of the pixels map the spot function.

In this manner, a "digital screen" is created. Image processing apparatus and processes are evaluated in part, by their capability of delivering a complete gray scale at normal viewing distances. The capability of a particular process to reproduce high frequency renditions (fine detail) with high contrast modulation makes that procedure superior to one which reproduces such fine detail with lesser or no output contrast.

Another measure of image processing apparatus and process merit is the tendency to produce visual artifacts in the output image that are not part of the original image, but are the result of the image processing. A conventional circular spot function consists of a spot which grows until it touches its neighbors in four places in the midtone region. This causes a change in dot gain near these regions, resulting in artifacts. Furthermore, the conventional circular spot creates awkwardly shaped white spots in regions with dark halftoning, aggravating dot gain. Mottling occurs on some high-speed printers when the spot function shape "stresses" the printer. Artifacts are present in midtone regions with some other spot functions. These artifacts are caused by the touching of the spot functions, and the resulting dot gain.

It can be seen that there is a need for a spot function that creates halftones that possess pleasing shapes in both light and dark regions, while controlling the manner in which growing spots touch in the intermediate gray regions.

It can also be seen that there is a need for a method and apparatus that provides a spot function that provides a more circular shape in the lighter and darker regions, reduces the stress on the printer, and reduces mottling.

It can also be seen that there is a need for a method and apparatus that provides more control over the position and severity of the touching of spot functions in the midtone regions.

SUMMARY OF THE INVENTION

To overcome the limitations in the prior art described above, and to overcome other limitations that will become apparent upon reading and understanding the present specification, the present invention discloses a digital halftoning technique for controlling a spot function to address gear noise, printer stress, and general print quality.

The present invention solves the above-described problems by using asymmetric modulation of spot functions in order to control the touching of adjacent spots, and to change the shape of the spots with the gray region. The resulting non-separable shape-changing spot function can reduce printer stress and improve print quality. In contrast, separable spot functions that are used conventionally in a number of systems result in midtone-region artifacts that the asymmetric, non-separable spot function avoids. The term "separable" as used herein designates functions of more than one variable, that can be factored into the product of functions in one variable only. For example, the function ½(cos(x+y)+cos(x−y)) is separable into cos(x) cos(y).

A method in accordance with the principles of the present invention includes defining a spot function that combines two functions selected to provide a predetermined spot shape for use in a halftone cell and scaling the spot function using a scaling function that varies according to a value of a first and second spot function ordinate.

Other embodiments of a method in accordance with the principles of the invention may include alternative or optional additional aspects. One such aspect of the present invention is that the two functions allow asymmetric changes in spot shape, where asymmetric changes denote those changes described by a non-separable spot function.

Another aspect of the present invention is that the spot function is described by:

$$f(x,y)=f_1(x,y)+f_2(x,y)/S(p,x,y),$$

where $f_1(x,y)$ and $f_2(x,y)$ are functions of x and/or y, and $S(p,x,y)$ is called the scaling function and wherein if S is a function of radius $r=\sqrt{x^2+y^2}$, then S may be written equivalently $S(p,r)$.

Another aspect of the present invention is that the spot function is described by:

$$f(x, y) = \frac{1}{2}\left(\cos(\pi x/p_x) + \frac{1}{S(p, r)}\cos(\pi y/p_y)\right)$$

where x and y are the first and second spot function ordinates, $p_x$ scales ordinate x, $p_y$ scales ordinate y, p is a spot shape parameter for controlling the shape of the spot, $S(p,r)$ is a scaling function, and r is the radius of the spot.

Another aspect of the present invention is that the scaling function, $S(p,r)$, is described by:

$$S(p, r) = 1 + \frac{1}{p_m\sqrt{2\pi}}\exp\left(-\frac{(r/\sqrt{2} - 1/2)^2}{2p^2}\right),$$

where $p_m$ sets a maximum ellipticity of the spot.

Another aspect of the present invention is that the spot function comprises angular orientation defined by:

$$f(x, y) = \frac{1}{2}\left(\cos(\pi(x+y)/p_x) + \frac{1}{S(p, r)}\cos(\pi(x-y)/p_y)\right).$$

In another embodiment of the present invention, a printing system is provided. The printing system includes a control unit for receiving a print file and processing the print file for printing, a print head for conveying a print job according to the print file and a device for generating a spot for use in halftoning wherein the halftoning reproduces an image defined by the print file using the print head, the device defines a spot function that combines two functions selected to provide a predetermined spot shape for use in a halftone cell and scales the spot function using a scaling function that varies according to a value of a first and second spot function ordinate.

Another aspect of the printing system of the present invention is that the two functions allow asymmetric changes in spot shape, where asymmetric changes denote those changes described by a non-separable spot function.

Another aspect of the printing system of the present invention is that the spot function is described by:

$$f(x,y)=f_1(x,y)+f_2(x,y)/S(p,x,y),$$

where $f_1(x,y)$ and $f_2(x,y)$ are functions of x and/or y, and $S(p,x,y)$ is called the scaling function and wherein if S is a function of radius $r=\sqrt{x^2+y^2}$, then S may be written equivalently $S(p,r)$.

Another aspect of the printing system of the present invention is that the spot function used by the device is described by:

$$f(x, y) = \frac{1}{2}\left(\cos(\pi x/p_x) + \frac{1}{S(p, r)}\cos(\pi y/p_y)\right)$$

where x and y are the first and second spot function ordinates, $p_x$ scales ordinate x, $p_y$ scales ordinate y, p is a spot shape parameter for controlling the shape of the spot, $S(p,r)$ is a scaling function, and r is the radius of the spot.

Another aspect of the printing system of the present invention is that the scaling function, $S(p,r)$, is described by:

$$S(p, r) = 1 + \frac{1}{p_m\sqrt{2\pi}}\exp\left(-\frac{(r/\sqrt{2} - 1/2)^2}{2p^2}\right),$$

where $p_m$ sets a maximum ellipticity of the spot.

Another aspect of the printing system of the present invention is that the spot function used by the device comprises angular orientation defined by:

$$f(x, y) = \frac{1}{2}\left(\cos(\pi(x+y)/p_x) + \frac{1}{S(p, r)}\cos(\pi(x-y)/p_y)\right).$$

Another aspect of the printing system of the present invention is that the device is a hardware card disposed between the control unit and the print head.

Another aspect of the printing system of the present invention is that the device is a hardware card disposed within the control unit.

Another aspect of the printing system of the present invention is that the printing system further comprises a print program of a computer for generating the print file, wherein the device comprises screening software loaded into the computer, the computer executing the screening software to perform the halftoning.

Another aspect of the printing system of the present invention is that the device comprises software loaded into the control unit, wherein the control unit executes the software to perform the halftoning.

In another embodiment of the present invention, a program storage medium readable by a computer is described. The medium tangibly embodies one or more programs of instructions executable by the computer to perform a method for halftoning an image, wherein the method includes defining a spot function that combines two functions selected to provide a predetermined spot shape for use in a halftone cell and scaling the spot function using a scaling function that varies according to a value of a first and second spot function ordinate.

Another aspect of the article of manufacture of the present invention is that the two functions allow asymmetric changes in spot shape, where asymmetric changes denote those changes described by a non-separable spot function.

Another aspect of the article of manufacture of the present invention is that the spot function is described by:

$$f(x,y) = f_1(x,y) + f_2(x,y)/S(p,x,y),$$

where $f_1(x,y)$ and $f_2(x,y)$ are functions of x and/or y, and $S(p,x,y)$ is called the scaling function and wherein if S is a function of radius $r = \sqrt{x^2 + y^2}$, then S may be written equivalently $S(p,r)$.

Another aspect of the article of manufacture of the present invention is that the spot function is described by:

$$f(x, y) = \frac{1}{2}\left(\cos(\pi x/p_x) + \frac{1}{S(p, r)}\cos(\pi y/p_y)\right)$$

where x and y are the first and second spot function ordinates, $p_x$ scales ordinate x, $p_y$ scales ordinate y, p is a spot shape parameter for controlling the shape of the spot, $S(p,r)$ is a scaling function, and r is the radius of the spot.

Another aspect of the article of manufacture of the present invention is that the scaling function, $S(p,r)$, is described by:

$$S(p, r) = 1 + \frac{1}{p_m\sqrt{2\pi}} \exp\left(-\frac{(r/\sqrt{2} - 1/2)^2}{2p^2}\right),$$

where $_m$ sets a maximum ellipticity of the spot.

Another aspect of the article of manufacture of the present invention is that the spot function comprises angular orientation defined by:

$$f(x, y) = \frac{1}{2}\left(\cos(\pi(x + y)/p_x) + \frac{1}{S(p, r)}\cos(\pi(x - y)/p_y)\right).$$

Another embodiment of a printing system comprises means for receiving a print file and processing the print file for printing, means for conveying a print job according to the print file and means for generating a spot for use in halftoning wherein the halftoning reproduces an image defined by the print file using the print head, the means for generating a spot defines a spot function that combines two functions selected to provide a predetermined spot shape for use in a halftone cell and scales the spot function using a scaling function that varies according to a value of a first and second spot function ordinate.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 6 illustrates a block diagram of a printer system according to the present invention.

DETAILED DESCRIPTION OF THE INVENTION

Figure 1:
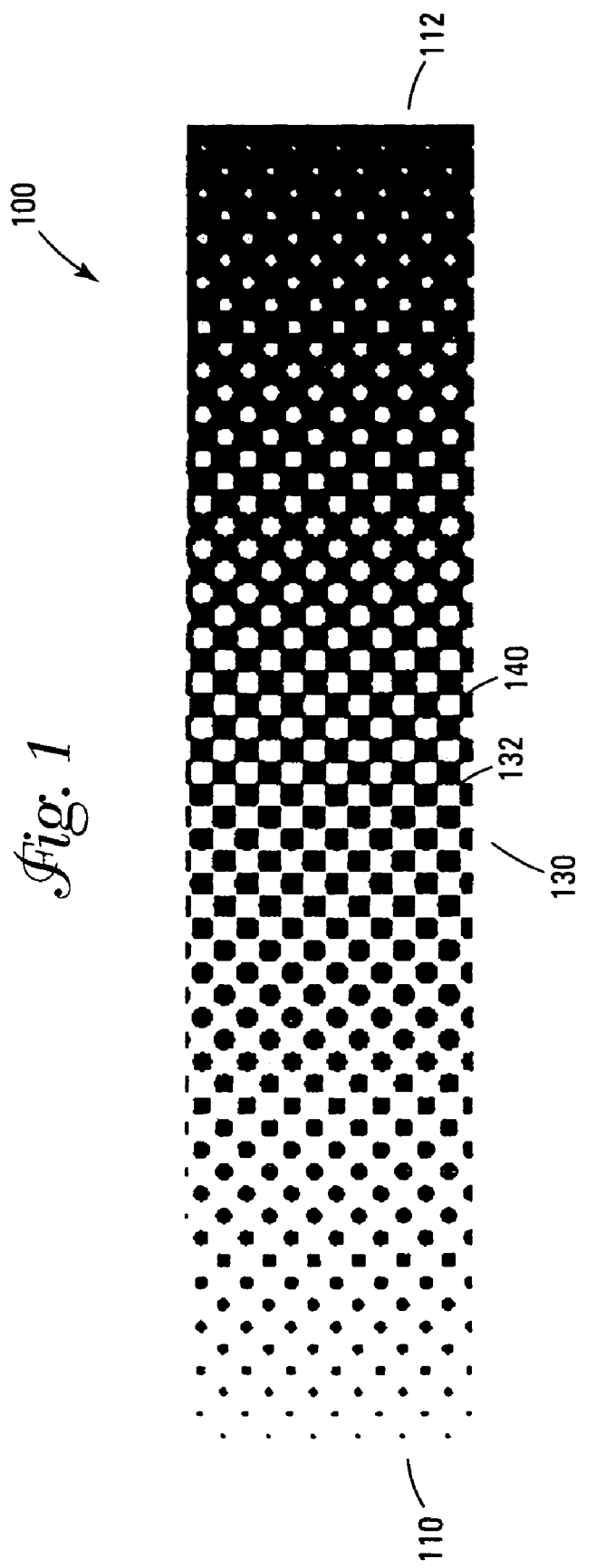
FIG. 1 illustrates a gray wedge produced using a prior art spot function.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a digital halftoning technique for controlling a spot function to address gear noise, printer stress, and general print quality. Asymmetric modulation of spot functions is used to control the touching of adjacent spots, and to change the shape of the spots with the gray region. The resulting non-separable shape-changing spot function can reduce printer stress and improve print quality. In contrast, separable spot functions that are used conventionally in a number of systems result in midtone-region artifacts that the asymmetric, non-separable spot function avoids. Herein, the term "separable" designates functions of more than one variable, that can be factored into the product of functions in one variable only. For example, the function cos½(cos(x+y)+cos(x−y)) is separable into cos(x) cos(y).

A spot function is a function of x and y that is used to describe the shape of a spot used for halftoning. The x and y values describe the coordinates in the cell in which the spot is drawn. The value of the spot function is a priority value, which determines the priority with which pels are printed (for example, made black). The value of the spot function may be thought of as analogous to the z axis. In a very light region, only the lowest-value pels are printed, while in a very dark region, many of the pels are printed, and only the highest-valued pels are not printed.

More specifically, a spot function f(x,y), taking the square [−1,1]×[−1,1] to the interval [−1,1] is an analytic expression describing the tendency with which pixels are set to black in a halftone screen. Considering f(x,y), the coordinates x,y from the interval [−1,1] describe the position within the screen at which this tendency is being calculated. A larger value of f(x,y) indicates a higher tendency toward being set to black. These tendency values are compared to a threshold, related to the grayscale level, to determine which pixels will be painted as black, and which as white. Thus, the screen pixel s(x,y) for a particular grayscale level L is black if and only if f(x,y)≧L, so the screen may be viewed as contours of f(x,y) in the x-y plane. This visualization allows the spot function to be designed for a particular set of requirements, since f may be formed by interpolating between the screen patterns at each of a set of grayscale levels.

The conventional circular spot function may be described in these terms as follows. If $f(x)=\sqrt{x^2+y^2}$, the spot function in light areas will appear as a black circle, which grows to the edges of the screen as the gray level is increased.

FIG. 1 illustrates a gray wedge 100 produced using a prior art spot function. The gray wedge 100 is a rectangle shaded from white on the left 110 to black on the right 112. The gray wedge 100 is halftoned very coarsely so that the spot shapes are clearly visible. Normally, images would be halftoned at less than 100 to more than 200 lines (halftone spots) per inch, so that the spot shapes would not be visible with the naked eye. However, because coarse halftoning has been used, how the spots change shape, how the spots touch, and what kind of artifacts might be caused by the shapes and the areas of touching are all visible.

The gray wedge 100 illustrated in FIG. 1 uses a spot function cos(πx)+cos(πy)

as was described in U.S. Pat. No. 4,196,451, which was issued Apr. 1, 1980 to Ronald J. Pellar (hereinafter referred to as Pellar). Pellar addressed the problem associated with Moire pattern effects. Pellar's method allows the shape and characteristics of the halftone dots to be rotated to reduce Moire pattern effects. According to Pellar, two signals (i.e., cosines) were modulated or compared to form a symmetric (i.e., x-y separable) spot function. This allowed circular spots to be created in the light regions 110, while inverse circular spots were created in the dark regions 112, using a spot function of the form of cos(x) cos(y). However, the spot function of Pellar still suffers from the problem in the intermediate (near 50%) gray levels 130, that the spots grow to touch 132 so that rectangular artifacts are created.

FIG. 1 clearly demonstrates a checkerboard type pattern 140 in the 50% gray region 130. This checkerboard type pattern 140 is undesirable, because it creates a pattern at 0 and 90 degrees that can be visible macroscopically, and will tend to distract the eye from the image that is printed.

According to the present invention a scaling function is defined as a function of the radius, so that the shape of the spot can be changed, for example, with radius. Herein, radius r is $\sqrt{x^2+y^2}$, where x and y in the range −1 to 1 are the spot function ordinates. Thus, the shape change of the spot function (with radius) is realized as a change of spot shape with grayscale level. The radius is used here because it is the Euclidean distance from the center of the spot to the edges of the screen, and is related to the change in spot shape with gray level because of the contour concept described above.

The problem of artifacts in the intermediate (i.e., near 50%) gray levels is solved by designing the spot function to be changed in these regions, so that the way in which growing spots touch other spots in adjacent cells is controlled. The design of the spot function is controlled through the scaling function, which is described more fully below.

Figure 2:
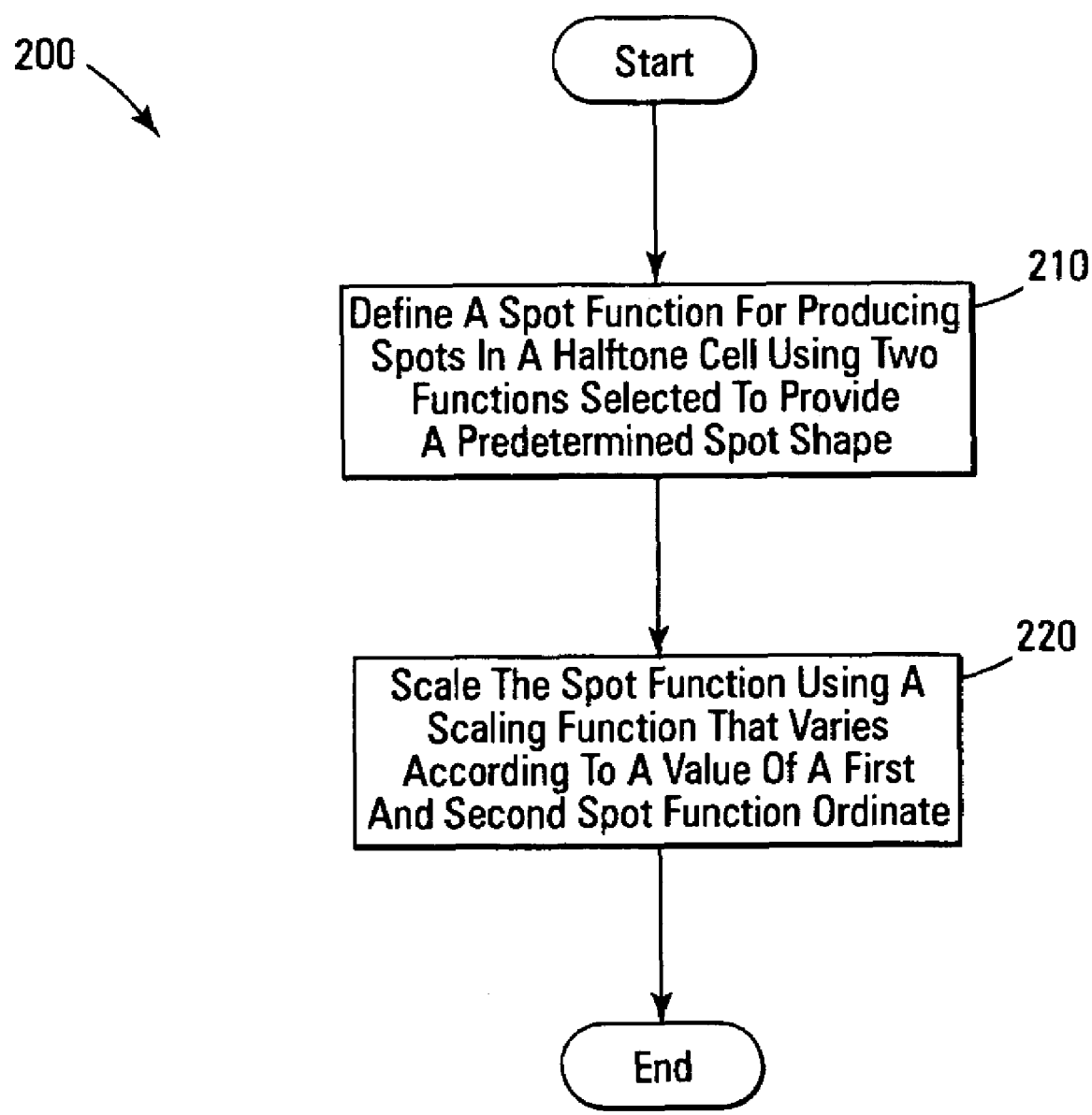
FIG. 2 illustrates a flow chart of the method for generating a spot for use in a halftone cell according to the present invention.

The present invention changes the shape of the spots in the intermediate gray levels in an asymmetric manner (i.e., non-separable in x-y) to reduce the artifacts. FIG. 2 illustrates a flow chart 200 of the method for generating a spot for producing spots in a halftone cell according to the present invention. First, a spot function for producing spots in a halftone cell is defined using two functions selected to provide a predetermined spot shape 210. The spot function is then scaled using a scaling function that varies according to a value of a first and second spot function ordinate 220.

To define the spot function according to a preferred embodiment of the present invention, four parameters are defined. First, $p_x$ and $p_y$ are used to scale x and y in the symmetric base functions. Then, p is used to control the shape change of the spot. Finally, $p_m$ sets the maximum ellipticity of the spots. Using cosines for the two signals, and a Gaussian shape as the scaling function, the spot function is described by $$f(x, y) = \frac{1}{2}\left(\cos(\pi x / p_x) + \frac{1}{S(p, r)}\cos(\pi y / p_y)\right)$$

where S(p,r) is the scaling function, a function of radius, as described above, and p is a parameter that controls the shape change of the spot. In the Gaussian case, $$S(p, r) = 1 + \frac{1}{p_m\sqrt{2\pi}}\exp\left(-\frac{\left(r/\sqrt{2} - 1/2\right)^2}{2p^2}\right)$$

Figure 3:
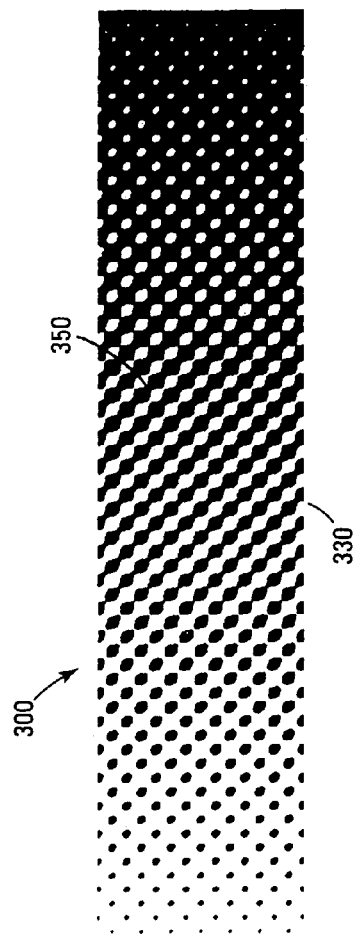
FIG. 3 shows a gray wedge wherein $p=p_m=0.8$ so that the spots touch only along a single 45 degree orientation in the 50% gray regions.

The parameters p and $p_m$ in this particular case can assume any positive value. The values of $p_x$ and $p_y$ will generally be taken equal to each other, and should always be close to unity to avoid changing the screening frequency; e.g., in what follows, $p_x=p_y=1$. FIG. 3 shows a gray wedge 300 wherein $p=p_m=0.8$ so that the spots touch only along a single 45 degree orientation 350 in the 50% gray regions 330, where the 45 degree orientation is that to which the human eye is least sensitive, and the rectangular angles are those to which the eye is most sensitive.

Note also that S(p,r) can be any parameterized function of radius, so that the shape of the halftone changes with radius. Moreover, S can be any parameterized (p) function of x and y, of which functions of radius are one special case since radius is a function of x and y, and which may be denoted by S(p,x,y). Note also that any of these four parameters can be excluded from the equation by setting to a default value; e.g., in the example show, $p_x$ or $p_y=1$, $p_m$ or p=1.

Figure 4:
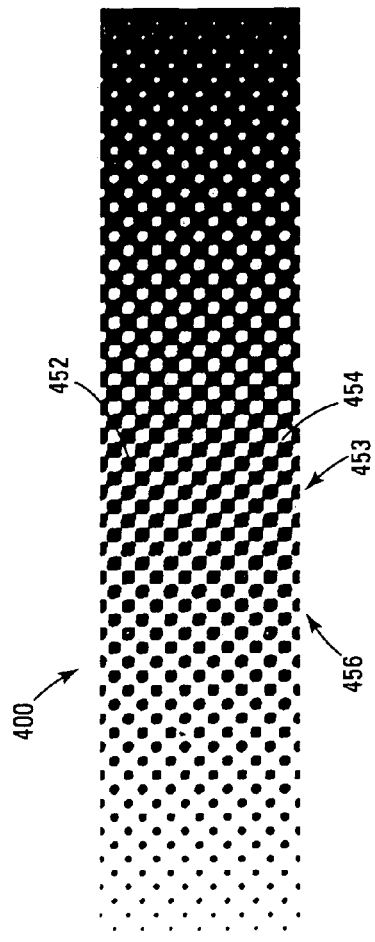
FIG. 4 shows a gray wedge having $p=p_m=2.5$, wherein the spots touch in two places along the same 45 degree orientation, and almost touch along the other 45 degree orientation, thereby reducing the rectangular artifact.

The approximate "correspondence" between light and dark regions can also be seen in this plot and those that follow. FIG. 4 shows a gray wedge 400 having $p=p_m=2.5$, wherein the spots touch in two places 452 along the same 45 degree orientation 453, and almost touch 454 along the other 45 degree orientation 456, thereby reducing the rectangular artifact.

Figure 5:
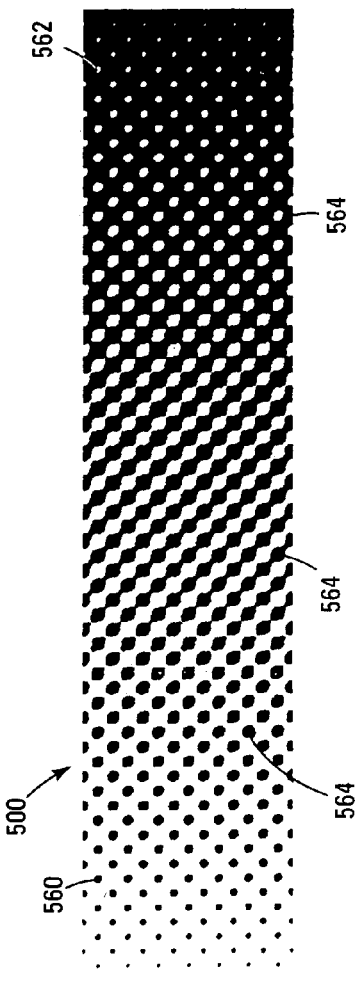
FIG. 5 shows a gray wedge with the results of having p=0.2.

An even more pleasing result is obtained by setting p and $p_m$ to be different, e.g., $p_m=0.8$. This controls the total amount of ellipticity that can occur in the shape-changing spot function, so that the parameter p controls only the regions where the spot function is approximately circular 560, 562, and those where it is more elliptical 564. FIG. 5 shows a gray wedge 500 with the results of having p=0.2. In a preferred embodiment of the present invention, $p_x=p_y=1$, $p_m=0.8$, and p=0.265.

Angular orientation can be built into the spot function by rewriting the spot function. For example, the 45-degree orientation is built in by writing $$f(x, y) = \frac{1}{2}\left(\cos(\pi(x+y)/p_x) + \frac{1}{S(p, r)}\cos(\pi(x-y)/p_y)\right)$$

The angle is changed through the combination of the x and y parameters, effectively rotating the resulting screen by 45 degrees. In this case, the effective screening frequency will be higher since each "square cell" contains 1 spot at the center with one quarter spot at each corner. This higher frequency must be taken into account in calculating threshold matrices. This does not change the shape of the spot function, only the orientation of halftoning cells. It should also be noted that the scaling function S(p,r) can also be moved to the other cosine term, rotating the effective screen, without departing from the spirit of this invention.

In general, f(x,y) would be of the form $f_1(x,y)+f_2(x,y)/S(p,x,y)$, where $f_1$ and $f_2$ are any functions to give the desired spot function shape. Herein, cosine is used as an example, but a Gaussian, such as $\exp(-x^2)$ could also be used. It could also be any polynomial or other function.

FIG. 6 illustrates a block diagram of a printer system 600 according to the present invention. The printer system 600 may include a printer, a facsimile device, copier, CRT or any other device that creates images using digital halftoning techniques. In FIG. 6, a user runs a print program 604 on, for example, a personal computer 610 to queue the job for printing. The print file is sent to the print spooler/server 620 for processing of the print file. The print program 604 could be integrated with the print spooler 620 as a single device such that, for example, the personal computer 610 and the print spooler 620 comprise a single device. The print file is then sent from the spooler 620 to an input 622 of a printer 630. The printer 630 includes a control unit 640 which receives the file, builds the page and may perform additional processing. The control unit 640 then passes the file to the print head 650. The print head 650 may indicate display device, e.g., laser hardware, LED hardware, inkjet hardware, etc. The control unit 640 may optionally be included inside the printer, or may actually be remote to the printer or combined with the spooler 620 or PC 610.

According to the present invention, a spot function for digital halftoning is provided that combines two signals that are adjusted by a scaling function, wherein the scaling function varies according to a value of a first and second spot function ordinate. The present invention is not meant to be limited to a particular location of the screening, i.e., halftoning. For example, the screening 606 may be performed in the print program 604, in a hardware card 660 between the control unit 640 and the print head 650, in a hardware card 662 inside the control unit 640 as a hardware assist or accelerator, in software 664 of the control unit 640, etc.

By way of further example, when the screening 606 according to the present invention is performed in the print program 604 a job is queued and processing may be performed to get the job ready for the control unit 640, e.g., turning Postscript into a raster image. The raster image, which may be color, grayscale or bitonal, is halftoned by the print program 604 to convert the raster image to dots. The image may be a whole page or one image on a page. The screened raster image is then sent to the control unit 640, potentially with other info, e.g., fonts, and images for the control unit 640 to build the page.

Still further, some printers may use a hardware card 660 disposed between the control unit 640 and the print head 650. The control unit 640 passes a complete raster image page, or part of a raster image page, to the hardware card 660. The image may contain color, grayscale or bitonal data. The hardware card 660 performs the halftone screening according to the present invention. The hardware card 660 then passes the screened image to the print head.

Some printers may have a hardware card 662 that is part of or inside the control unit 640 to act as a hardware assist or accelerator. The control unit 640 passes at least a portion of a raster image page to the hardware card 662. The hardware card 662 performs screening according to the present invention and the hardware card 662 passes the screened image back to the control unit 640.

In yet another embodiment, the screening according to the present invention may be performed in software 664 of the control unit 640. The control unit 640 can build an entire page as a raster image and screen the whole page using the screening software 664. Alternatively, the control unit 640 may screen pieces of the page as the page is built. The screened page can then be sent directly to the print head 650 or stored internally by the controller for later transmission.

The process illustrated with reference to FIGS. 2-6 may be tangibly embodied in a computer-readable medium or carrier, e.g. one or more of the fixed and/or removable data storage devices 690 illustrated in FIG. 6, or other data storage. A computer program 692 may be loaded into the print system 600 to configure the print system 600 of FIG. 6 for execution. For example, the computer program may be loaded in the print program 604, in a hardware card 660 between the control unit 640 and the print head 650, in a hardware card 662 inside the control unit 640, in software 664 of the control unit 640, etc. The computer program 692 comprises instructions which, when read and executed by the print system 600 of FIG. 6, causes the print system 600 to perform the steps necessary to execute the steps or elements of the present invention.

The present invention provides an advantage of allowing the spot function to vary in shape continuously over the range of gray levels. The result is that light and dark regions contain circular spots, which give lower stress on the printer, while elliptical spots are used only in the midtone regions. Continuous variation ensures that image regions of mixed gray levels will have spots of similar shape near each other when the gray levels are similar. This provides a visually pleasing shape without artifacts or mottling.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for generating a spot for use in halftoning, comprising:
    defining a spot function that combines two functions selected to provide asymmetrically changing of the shape of a spot for use in a halftone cell;
    scaling the spot function according to grayscale levels using a parameterized spot radius scaling function that varies according to a value of a first and second spot function ordinate and an asymmetric shape changing scaling function based on a gray level for the spot, and printing using the scaled spot function;

wherein the spot function is described by:

$$f(x, y) = \frac{1}{2}\left(\cos(\pi x/p_x) + \frac{1}{S(p, r)}\cos(\pi y/p_y)\right)$$

where x and y are the first and second spot function ordinates, $p_x$ scales ordinate x, $p_y$ scales ordinate y, p is a spot shape parameter for controlling the shape of the spot, $S(p,r)$ is a scaling function, and r is the radius of the spot.

2. The method of claim 1, wherein the two functions allow non-separable changes in spot shape.

3. The method of claim 1, wherein the scaling function, $S(p,r)$, is described by:

$$S(p, r) = 1 + \frac{1}{p_m\sqrt{2\pi}}\exp\left(-\frac{(r/\sqrt{2} - 1/2)^2}{2p^2}\right),$$

where $p_m$ sets a maximum ellipticity of the spot.

4. A printing system, comprising:
a control unit for receiving a print file and processing the print file for printing;
a print head for conveying a print job according to the print file; and
a device for generating a spot for use in halftoning wherein the halftoning reproduces an image defined by the print file using the print head, the device defines a spot function that combines two functions selected to provide asymmetrically changing of the shape of a spot for use in a halftone cell and scales the spot function according to grayscale level using a parameterized spot radius scaling function that varies according to a value of a first and second spot function ordinate and an asymmetric shape changing scaling function based on a gray level for the spot,
wherein the spot function used by the device is described by:

$$f(x, y) = \frac{1}{2}\left(\cos(\pi x/p_x) + \frac{1}{S(p, r)}\cos(\pi y/p_y)\right)$$

where x and y are the first and second spot function ordinates, $p_x$ scales ordinate x, $p_y$ scales ordinate y, p is a spot shape parameter for controlling the shape of the spot, $S(p,r)$ is a scaling function, and r is the radius of the spot.

5. The printing system of claim 4, wherein the two functions allow non-separable changes in spot shape.

6. The printing system of claim 4, wherein the scaling function, $S(p,r)$, is described by:

$$S(p, r) = 1 + \frac{1}{p_m\sqrt{2\pi}}\exp\left(-\frac{(r/\sqrt{2} - 1/2)^2}{2p^2}\right),$$

where $p_m$ sets a maximum ellipticity of the spot.

7. The printing system of claim 4, wherein the device is a hardware card disposed between the control unit and the print head.

8. The printing system of claim 4, wherein the device is a hardware card disposed within the control unit.

9. A program storage medium readable by a computer, the medium tangibly embodying one or more programs of instructions executable by the computer to perform halftoning an image by:
defining a spot function that combines two functions selected to provide asymmetrically changing of the shape of a spot for use in a halftone cell;
scaling the spot function according to grayscale level using a parameterized spot radius scaling function that varies according to a value of a first and second spot function ordinate and an asymmetric shape changing scaling function based on a gray level for the spot, and
printing using the scaled spot function;
wherein the spot function is described by:

$$f(x, y) = \frac{1}{2}\left(\cos(\pi x/p_x) + \frac{1}{S(p, r)}\cos(\pi y/p_y)\right)$$

where x and y are the first and second spot function ordinates, $p_x$ scales ordinate x, $p_y$ scales ordinate y, p is a spot shape parameter for controlling the shape of the spot, $S(p,r)$ is a scaling function, and r is the radius of the spot.

10. The program storage medium of claim 9, wherein the two functions allow non-separable changes in spot shape.

11. The program storage medium of claim 9, wherein the scaling function, $S(p,r)$, is described by:

$$S(p, r) = 1 + \frac{1}{p_m\sqrt{2\pi}}\exp\left(-\frac{(r/\sqrt{2} - 1/2)^2}{2p^2}\right),$$

where $p_m$ sets a maximum ellipticity of the spot.

12. A printing system, comprising:
means for receiving a print file and processing the print file for printing;
means for conveying a print job according to the print file; and
means for generating a spot for use in halftoning wherein the halftoning reproduces an image defined by the print file using the print head, the means for generating a spot defines a spot function that combines two functions selected to provide asymmetrically changing of the shape of a spot for use in a halftone cell and scales the spot function according to grayscale level using a parameterized spot radius scaling function that varies according to a value of a first and second spot function ordinate and an asymmetric shape changing scaling function based on a gray level for the spot,
wherein the spot function is described by:

$$f(x, y) = \frac{1}{2}\left(\cos(\pi x/p_x) + \frac{1}{S(p, r)}\cos(\pi y/p_y)\right)$$

where x and y are the first and second spot function ordinates, $p_x$ scales ordinate x, $p_y$ scales ordinate y, p is a spot shape parameter for controlling the shape of the spot, $S(p,r)$ is a scaling function, and r is the radius of the spot.

* * * * *